United States Patent
Hsu et al.

(10) Patent No.: US 9,483,251 B2
(45) Date of Patent: Nov. 1, 2016

(54) BASIC INPUT/OUTPUT SYSTEM UPDATING METHOD AND COMPUTER READABLE STORAGE MEDIUM

(71) Applicant: Wistron Corporation, New Taipei (TW)

(72) Inventors: An-Yu Hsu, New Taipei (TW); Wei-Min Yang, New Taipei (TW)

(73) Assignee: Wistron Corporation, New Taipei (TW)

( * ) Notice: Subject to any disclaimer, the term of this patent is extended or adjusted under 35 U.S.C. 154(b) by 73 days.

(21) Appl. No.: 14/564,097

(22) Filed: Dec. 9, 2014

(65) Prior Publication Data
US 2015/0261520 A1 Sep. 17, 2015

(30) Foreign Application Priority Data
Mar. 12, 2014 (TW) .............................. 103108744 A

(51) Int. Cl.
G06F 9/44 (2006.01)
G06F 9/445 (2006.01)
G06F 21/57 (2013.01)
G06F 11/22 (2006.01)

(52) U.S. Cl.
CPC ............. *G06F 8/65* (2013.01); *G06F 11/2284* (2013.01); *G06F 21/572* (2013.01)

(58) Field of Classification Search
CPC ..... G06F 8/65; G06F 11/2284; G06F 21/572
See application file for complete search history.

(56) References Cited

U.S. PATENT DOCUMENTS

| 7,000,101 | B2 * | 2/2006 | Wu ........................... G06F 8/65 713/1 |
| 7,095,858 | B2 * | 8/2006 | Wagner ................. G06F 21/572 380/281 |
| 7,367,027 | B1 * | 4/2008 | Chen ......................... G06F 8/68 707/999.202 |
| 8,392,697 | B1 | 3/2013 | Natarajan |
| 8,874,892 | B1 * | 10/2014 | Chan ..................... G06F 21/572 713/100 |
| 8,874,922 | B2 * | 10/2014 | Jaber ....................... G06F 21/57 713/153 |
| 9,158,628 | B2 * | 10/2015 | Maity ................. G06F 11/1435 |
| 2003/0120913 | A1 * | 6/2003 | Wu ........................... G06F 8/65 713/100 |
| 2003/0191955 | A1 * | 10/2003 | Wagner ................. G06F 21/572 713/191 |
| 2014/0259000 | A1 * | 9/2014 | Desanti .................... G06F 8/65 717/171 |

* cited by examiner

*Primary Examiner* — M Elamin
(74) *Attorney, Agent, or Firm* — Winston Hsu; Scott Margo

(57) ABSTRACT

A BIOS updating method determines whether to allow a current BIOS version to be upgraded or downgraded to a target BIOS version according to a dependency description recorded in a BIOS updating program or a dependency description recorded in an SMBIOS. If all of the BIOS versions recorded in the dependency description are not between the current BIOS version and the target BIOS version, the BIOS updating program allows the current BIOS version to be upgraded or downgraded to the target BIOS version. If at least one of the BIOS versions recorded in the dependency description is between the current BIOS version and the target BIOS version, the BIOS updating program forbids the current BIOS version to be directly upgraded or downgraded to the target BIOS version.

12 Claims, 1 Drawing Sheet

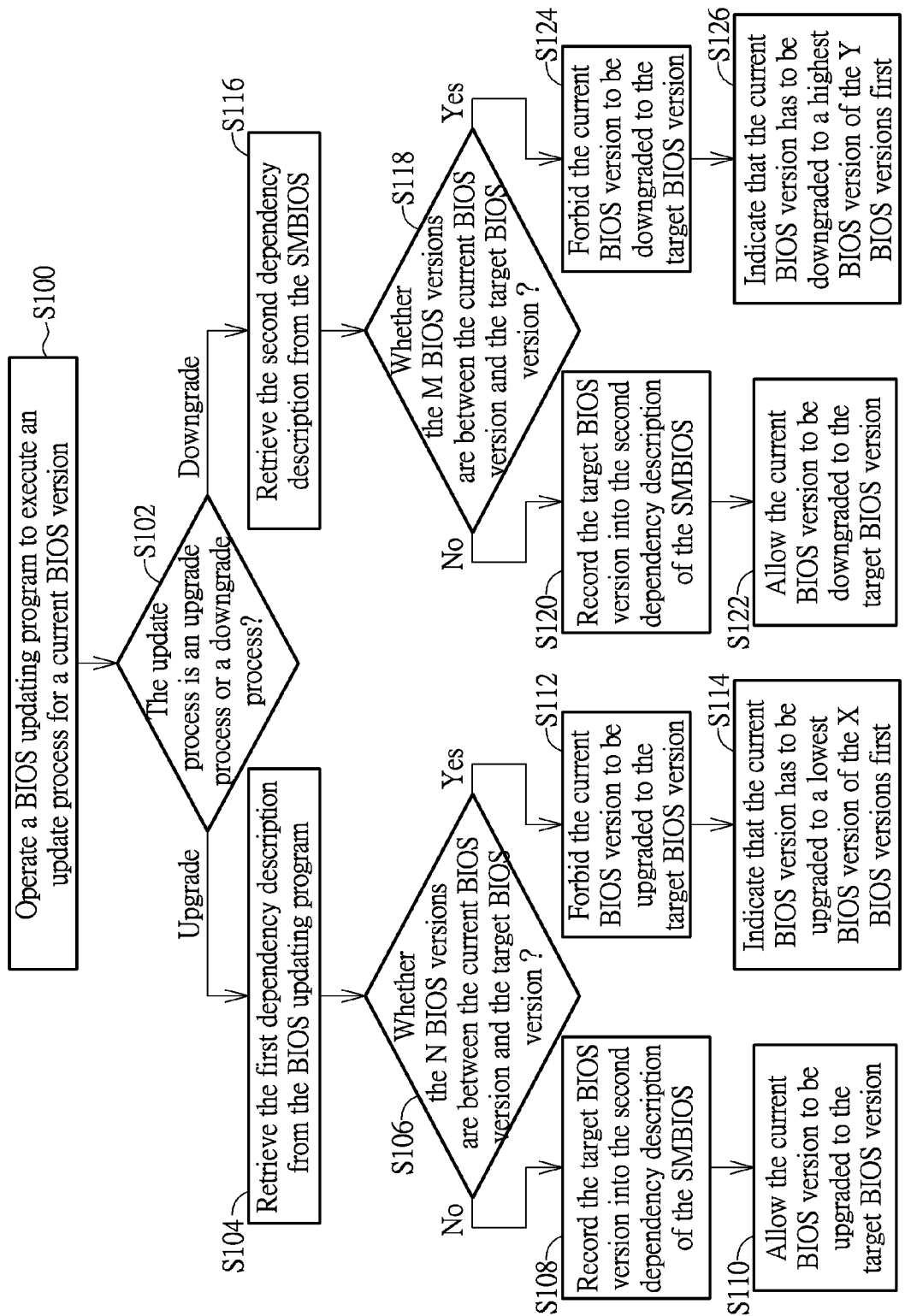

BASIC INPUT/OUTPUT SYSTEM UPDATING METHOD AND COMPUTER READABLE STORAGE MEDIUM

BACKGROUND OF THE INVENTION

1. Field of the Invention

The invention relates to a basic input/output system (BIOS) updating method and, more particularly, to a BIOS updating method capable of avoiding updating a current BIOS version to a wrong BIOS version, resulting in that a computer cannot be booted.

2. Description of the Prior Art

A basic input/output system (BIOS) is used to execute self-inspection and operating system when a computer is being booted. When the computer is powered on, the BIOS is executed in a flash memory installed on a main board to initialize chip set and memory subsystem. The main function of the BIOS is to ensure that some important hardware components (e.g. keyboard, disc device, input/output port, etc.) can work normally and be initialized accurately. As the hardware components advance and develop rapidly, the BIOS also has to be updated continuously, so as to support new hardware components. However, when a user wants to update a current BIOS version to a target BIOS version (e.g. upgrade or downgrade) and the difference between the target BIOS version and the current BIOS version is huge, the computer may be unable to be booted after the update process.

SUMMARY OF THE INVENTION

The invention provides a basic input/output system (BIOS) updating method and a computer readable storage medium, so as to solve the aforesaid problems.

According to the claimed invention, a BIOS updating method comprises steps of when a BIOS updating program executes an update process for a current BIOS version, determining that the update process is an upgrade process or a downgrade process, wherein the BIOS updating program is corresponding to a target BIOS version, the BIOS updating program records a first dependency description, the first dependency description records N BIOS versions, N is a positive integer, a system management BIOS (SMBIOS) records a second dependency description, the second dependency description records M BIOS versions, and M is a positive integer; if the update process is the upgrade process, retrieving the first dependency description from the BIOS updating program; determining whether the N BIOS versions are between the current BIOS version and the target BIOS version; if all of the N BIOS versions are not between the current BIOS version and the target BIOS version, allowing the current BIOS version to be upgraded to the target BIOS version; if the update process is the downgrade process, retrieving the second dependency description from the SMBIOS; determining whether the M BIOS versions are between the current BIOS version and the target BIOS version; and if all of the M BIOS versions are not between the current BIOS version and the target BIOS version, allowing the current BIOS version to be downgraded to the target BIOS version.

According to the claimed invention, the BIOS updating method further comprises step of before upgrading or downgrading the current BIOS version to the target BIOS version, recording the target BIOS version into the second dependency description.

According to the claimed invention, the BIOS updating method further comprises step of if X BIOS versions of the N BIOS versions are between the current BIOS version and the target BIOS version, forbidding the current BIOS version to be upgraded to the target BIOS version, wherein X is a positive integer smaller than or equal to N.

According to the claimed invention, the BIOS updating method further comprises step of indicating that the current BIOS version has to be upgraded to a lowest BIOS version of the X BIOS versions first.

According to the claimed invention, the BIOS updating method further comprises step of if Y BIOS versions of the M BIOS versions are between the current BIOS version and the target BIOS version, forbidding the current BIOS version to be downgraded to the target BIOS version, wherein Y is a positive integer smaller than or equal to M.

According to the claimed invention, the BIOS updating method further comprises step of indicating that the current BIOS version has to be downgraded to a highest BIOS version of the Y BIOS versions first.

According to the claimed invention, a computer readable storage medium is used for storing a set of instructions and the set of instructions execute steps of when a BIOS updating program executes an update process for a current BIOS version, determining that the update process is an upgrade process or a downgrade process, wherein the BIOS updating program is corresponding to a target BIOS version, the BIOS updating program records a first dependency description, the first dependency description records N BIOS versions, N is a positive integer, a system management BIOS (SMBIOS) records a second dependency description, the second dependency description records M BIOS versions, and M is a positive integer; if the update process is the upgrade process, retrieving the first dependency description from the BIOS updating program; determining whether the N BIOS versions are between the current BIOS version and the target BIOS version; if all of the N BIOS versions are not between the current BIOS version and the target BIOS version, allowing the current BIOS version to be upgraded to the target BIOS version; if the update process is the downgrade process, retrieving the second dependency description from the SMBIOS; determining whether the M BIOS versions are between the current BIOS version and the target BIOS version; and if all of the M BIOS versions are not between the current BIOS version and the target BIOS version, allowing the current BIOS version to be downgraded to the target BIOS version.

According to the claimed invention, the set of instructions execute step of before upgrading or downgrading the current BIOS version to the target BIOS version, recording the target BIOS version into the second dependency description.

According to the claimed invention, the set of instructions execute step of if X BIOS versions of the N BIOS versions are between the current BIOS version and the target BIOS version, forbidding the current BIOS version to be upgraded to the target BIOS version, wherein X is a positive integer smaller than or equal to N.

According to the claimed invention, the set of instructions execute step of indicating that the current BIOS version has to be upgraded to a lowest BIOS version of the X BIOS versions first.

According to the claimed invention, the set of instructions execute step of if Y BIOS versions of the M BIOS versions are between the current BIOS version and the target BIOS version, forbidding the current BIOS version to be downgraded to the target BIOS version, wherein Y is a positive integer smaller than or equal to M.

According to the claimed invention, the set of instructions execute step of indicating that the current BIOS version has to be downgraded to a highest BIOS version of the Y BIOS versions first.

As mentioned in the above, when a user wants to update the current BIOS version to the target BIOS version, the BIOS updating program determines whether to allow the current BIOS version to be upgraded or downgraded to the target BIOS version according to the dependency description recorded in the BIOS updating program or the dependency description recorded in the SMBIOS selectively. If all of the BIOS versions recorded in the dependency description are not between the current BIOS version and the target BIOS version, the BIOS updating program allows the current BIOS version to be upgraded or downgraded to the target BIOS version. If at least one of the BIOS versions recorded in the dependency description is between the current BIOS version and the target BIOS version, the BIOS updating program forbids the current BIOS version to be directly upgraded or downgraded to the target BIOS version. When the BIOS updating program forbids the current BIOS version to be directly upgraded or downgraded to the target BIOS version, the BIOS updating program may indicate the user that the current BIOS version has to be updated to a specific BIOS version between the current BIOS version and the target BIOS version first. Accordingly, the user can update the current BIOS version to the target BIOS version gradually, so as to avoid updating the current BIOS version to a wrong BIOS version, resulting in that a computer cannot be booted.

These and other objectives of the present invention will no doubt become obvious to those of ordinary skill in the art after reading the following detailed description of the preferred embodiment that is illustrated in the FIGURE.

BRIEF DESCRIPTION OF THE DRAWINGS

The FIGURE is a flowchart illustrating a BIOS updating method according to an embodiment of the invention.

DETAILED DESCRIPTION

Referring to the FIGURE, the FIGURE is a flowchart illustrating a basic input/output system (BIOS) updating method according to an embodiment of the invention. The BIOS updating method of the invention is adapted to any computers having a BIOS installed therein.

First of all, when a user operates a BIOS updating program to execute an update process for a current BIOS version (step S100 in the FIGURE), the BIOS updating program determines that the update process is an upgrade process or a downgrade process (step S102 in the FIGURE), wherein the BIOS updating program is corresponding to a target BIOS version. In this embodiment, the BIOS updating program records a first dependency description and the first dependency description records N BIOS versions, wherein N is a positive integer. Furthermore, a system management BIOS (SMBIOS) records a second dependency description and the second dependency description records M BIOS versions, wherein M is a positive integer.

In step S102, if the BIOS updating program determines that the update process is the upgrade process, the BIOS updating program retrieves the first dependency description from the BIOS updating program (step S104 in the FIGURE). Afterward, the BIOS updating program determines whether the N BIOS versions recorded in the first dependency description are between the current BIOS version and the target BIOS version (step S106 in the FIGURE). If all of the N BIOS versions recorded in the first dependency description are not between the current BIOS version and the target BIOS version, the BIOS updating program allows the current BIOS version to be upgraded to the target BIOS version (step S110 in the FIGURE). It should be noted that before upgrading the current BIOS version to the target BIOS version, the BIOS updating program will record the target BIOS version into the second dependency description of the SMBIOS (step S108 in the FIGURE), so as to be a reference for downgrading the BIOS next time.

For example, provided that the current BIOS version is #20, the target BIOS version is #25, the first dependency description is represented by {12, 15, 19} (i.e. the first dependency description records three BIOS versions #12, #15, #19), and the second dependency description is represented by {10, 20} (i.e. the second dependency description records two BIOS versions #10, #20). When the user wants to update the current BIOS version #20 to the target BIOS version #25 by the BIOS updating program, the BIOS updating program determines that the update process is the upgrade process since the target BIOS version #25 is higher than the current BIOS version #20. Since all of the three BIOS versions #12, #15, #19 recorded in the first dependency description are not between the current BIOS version #20 and the target BIOS version #25, the BIOS updating program will record the target BIOS version #25 into the second dependency description of the SMBIOS first and then upgrade the current BIOS version #20 to the target BIOS version #25. After updating the BIOS, the second dependency description of the SMBIOS is represented by {10, 20, 25} accordingly.

In step S106, if X BIOS versions of the N BIOS versions recorded in the first dependency description are between the current BIOS version and the target BIOS version, the BIOS updating program forbids the current BIOS version to be upgraded to the target BIOS version (step S112 in the FIGURE), wherein X is a positive integer smaller than or equal to N. In this embodiment, the BIOS updating program may indicate the user that the current BIOS version has to be upgraded to a lowest BIOS version of the X BIOS versions first (step S114 in the FIGURE), so as to avoid updating the current BIOS version to a wrong BIOS version, resulting in that a computer cannot be booted.

It should be noted that the lowest BIOS version is selected from at least one BIOS version between the current BIOS version and the target BIOS version and recorded in the first dependency description. In general, the lowest BIOS version represents one older than the other BIOS versions recorded in the first dependency description and the user has to upgrade the current BIOS version to the lowest BIOS version recorded in the first dependency description first.

For example, provided that the current BIOS version is #20, the target BIOS version is #25, and the first dependency description is represented by {12, 15, 21, 23} (i.e. the first dependency description records four BIOS versions #12, #15, #21, #23). Since two BIOS versions #21, #23 of the four BIOS versions #12, #15, #21, #23 recorded in the first dependency description are between the current BIOS version #20 and the target BIOS version #25, the BIOS updating program will forbid the current BIOS version #20 to be directly upgraded to the target BIOS version #25 and indicate the user that the current BIOS version #20 has to be upgraded to a lowest BIOS version #21 of the two BIOS versions #21, #23 first. Accordingly, the user can update the current BIOS version #20 to the middle BIOS versions #21, #23 and then to the target BIOS version #25 gradually, so as to avoid updating the current BIOS version #20 to a wrong BIOS version, resulting in that a computer cannot be booted.

In step S102, if the BIOS updating program determines that the update process is the downgrade process, the BIOS updating program retrieves the second dependency description from the SMBIOS (step S116 in the FIGURE). Afterward, the BIOS updating program determines whether the M BIOS versions recorded in the second dependency description are between the current BIOS version and the target BIOS version (step S118 in the FIGURE). If all of the M BIOS versions recorded in the second dependency description are not between the current BIOS version and the target BIOS version, the BIOS updating program allows the current BIOS version to be downgraded to the target BIOS version (step S122 in the FIGURE). It should be noted that before downgrading the current BIOS version to the target BIOS version, the BIOS updating program will record the target BIOS version into the second dependency description of the SMBIOS (step S120 in the FIGURE), so as to be a reference for downgrading the BIOS next time.

For example, provided that the current BIOS version is #20, the target BIOS version is #15, and the second dependency description is represented by {10, 13, 20} (i.e. the second dependency description records three BIOS versions #10, #13, #20). When the user wants to update the current BIOS version #20 to the target BIOS version #15 by the BIOS updating program, the BIOS updating program determines that the update process is the downgrade process since the target BIOS version #15 is lower than the current BIOS version #20. Since all of the three BIOS versions #10, #13, #20 recorded in the second dependency description are not between the current BIOS version #20 and the target BIOS version #15, the BIOS updating program will record the target BIOS version #15 into the second dependency description of the SMBIOS first and then downgrade the current BIOS version #20 to the target BIOS version #15. After updating the BIOS, the second dependency description of the SMBIOS is represented by {10, 13, 15, 20} accordingly.

In step S118, if Y BIOS versions of the M BIOS versions recorded in the second dependency description are between the current BIOS version and the target BIOS version, the BIOS updating program forbids the current BIOS version to be downgraded to the target BIOS version (step S124 in the FIGURE), wherein Y is a positive integer smaller than or equal to M. In this embodiment, the BIOS updating program may indicate the user that the current BIOS version has to be downgraded to a highest BIOS version of the Y BIOS versions first (step S126 in the FIGURE), so as to avoid updating the current BIOS version to a wrong BIOS version, resulting in that a computer cannot be booted.

It should be noted that the highest BIOS version is selected from at least one BIOS version between the current BIOS version and the target BIOS version and recorded in the second dependency description. In general, the highest BIOS version represents one newer than the other BIOS versions recorded in the second dependency description and the user has to downgrade the current BIOS version to the highest BIOS version recorded in the second dependency description first.

For example, provided that the current BIOS version is #20, the target BIOS version is #15, and the second dependency description is represented by {10, 13, 16, 18, 20} (i.e. the second dependency description records five BIOS versions #10, #13, #16, #18, #20). Since two BIOS versions #16, #18 of the five BIOS versions #10, #13, #16, #18, #20 recorded in the second dependency description are between the current BIOS version #20 and the target BIOS version #15, the BIOS updating program will forbid the current BIOS version #20 to be directly downgraded to the target BIOS version #15 and indicate the user that the current BIOS version #20 has to be downgraded to a highest BIOS version #18 of the two BIOS versions #16, #18 first. Accordingly, the user can update the current BIOS version #20 to the middle BIOS versions #18, #16 and then to the target BIOS version #15 gradually, so as to avoid updating the current BIOS version #20 to a wrong BIOS version, resulting in that a computer cannot be booted.

It should be noted that the control logic of the BIOS updating method shown in the FIGURE can be implemented by software. The software can be executed in any electronic devices having a BIOS installed therein. Needless to say, each part or function of the control logic may be implemented by software, hardware or the combination thereof. Moreover, the control logic of the BIOS updating method shown in the FIGURE can be embodied by a computer readable storage medium, wherein the computer readable storage medium stores instructions, which can be executed by the electronic device, so as to generate control command for executing corresponding function.

As mentioned in the above, when a user wants to update the current BIOS version to the target BIOS version, the BIOS updating program determines whether to allow the current BIOS version to be upgraded or downgraded to the target BIOS version according to the dependency description recorded in the BIOS updating program or the dependency description recorded in the SMBIOS selectively. If all of the BIOS versions recorded in the dependency description are not between the current BIOS version and the target BIOS version, the BIOS updating program allows the current BIOS version to be upgraded or downgraded to the target BIOS version. If at least one of the BIOS versions recorded in the dependency description is between the current BIOS version and the target BIOS version, the BIOS updating program forbids the current BIOS version to be directly upgraded or downgraded to the target BIOS version. When the BIOS updating program forbids the current BIOS version to be directly upgraded or downgraded to the target BIOS version, the BIOS updating program may indicate the user that the current BIOS version has to be updated to a specific BIOS version between the current BIOS version and the target BIOS version first. Accordingly, the user can update the current BIOS version to the target BIOS version gradually, so as to avoid updating the current BIOS version to a wrong BIOS version, resulting in that a computer cannot be booted.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A basic input/output system (BIOS) updating method comprising:
when a BIOS updating program executes an update process for a current BIOS version, determining that the update process is an upgrade process or a downgrade process, wherein the BIOS updating program is corresponding to a target BIOS version, the BIOS updating program records a first dependency description, the first dependency description records N BIOS versions, N is a positive integer, a system management BIOS (SMBIOS) records a second dependency description, the second dependency description records M BIOS versions, and M is a positive integer;

if the update process is the upgrade process, retrieving the first dependency description from the BIOS updating program;

determining whether the N BIOS versions are between the current BIOS version and the target BIOS version;

if all of the N BIOS versions are not between the current BIOS version and the target BIOS version, allowing the current BIOS version to be upgraded to the target BIOS version;

if the update process is the downgrade process, retrieving the second dependency description from the SMBIOS;

determining whether the M BIOS versions are between the current BIOS version and the target BIOS version; and if all of the M BIOS versions are not between the current BIOS version and the target BIOS version, allowing the current BIOS version to be downgraded to the target BIOS version.

2. The BIOS updating method of claim 1, further comprising:

before upgrading or downgrading the current BIOS version to the target BIOS version, recording the target BIOS version into the second dependency description.

3. The BIOS updating method of claim 1, further comprising:

if X BIOS versions of the N BIOS versions are between the current BIOS version and the target BIOS version, forbidding the current BIOS version to be upgraded to the target BIOS version, X being a positive integer smaller than or equal to N.

4. The BIOS updating method of claim 3, further comprising:

indicating that the current BIOS version has to be upgraded to a lowest BIOS version of the X BIOS versions first.

5. The BIOS updating method of claim 1, further comprising:

if Y BIOS versions of the M BIOS versions are between the current BIOS version and the target BIOS version, forbidding the current BIOS version to be downgraded to the target BIOS version, Y being a positive integer smaller than or equal to M.

6. The BIOS updating method of claim 5, further comprising:

indicating that the current BIOS version has to be downgraded to a highest BIOS version of the Y BIOS versions first.

7. A non-transitory computer readable storage medium for storing a set of instructions, the set of instructions executing steps of:

when a BIOS updating program executes an update process for a current BIOS version, determining that the update process is an upgrade process or a downgrade process, wherein the BIOS updating program is corresponding to a target BIOS version, the BIOS updating program records a first dependency description, the first dependency description records N BIOS versions, N is a positive integer, a system management BIOS (SMBIOS) records a second dependency description, the second dependency description records M BIOS versions, and M is a positive integer;

if the update process is the upgrade process, retrieving the first dependency description from the BIOS updating program;

determining whether the N BIOS versions are between the current BIOS version and the target BIOS version;

if all of the N BIOS versions are not between the current BIOS version and the target BIOS version, allowing the current BIOS version to be upgraded to the target BIOS version;

if the update process is the downgrade process, retrieving the second dependency description from the SMBIOS;

determining whether the M BIOS versions are between the current BIOS version and the target BIOS version; and if all of the M BIOS versions are not between the current BIOS version and the target BIOS version, allowing the current BIOS version to be downgraded to the target BIOS version.

8. The non-transitory computer readable storage medium of claim 7, the set of instructions executing step of:

before upgrading or downgrading the current BIOS version to the target BIOS version, recording the target BIOS version into the second dependency description.

9. The non-transitory computer readable storage medium of claim 7, the set of instructions executing step of:

if X BIOS versions of the N BIOS versions are between the current BIOS version and the target BIOS version, forbidding the current BIOS version to be upgraded to the target BIOS version, X being a positive integer smaller than or equal to N.

10. The non-transitory computer readable storage medium of claim 9, the set of instructions executing step of:

indicating that the current BIOS version has to be upgraded to a lowest BIOS version of the X BIOS versions first.

11. The non-transitory computer readable storage medium of claim 7, the set of instructions executing step of:

if Y BIOS versions of the M BIOS versions are between the current BIOS version and the target BIOS version, forbidding the current BIOS version to be downgraded to the target BIOS version, Y being a positive integer smaller than or equal to M.

12. The non-transitory computer readable storage medium of claim 11, the set of instructions executing step of:

indicating that the current BIOS version has to be downgraded to a highest BIOS version of the Y BIOS versions first.

* * * * *